United States Patent
Samitt et al.

(10) Patent No.: US 10,482,467 B1
(45) Date of Patent: Nov. 19, 2019

(54) SYSTEMS AND METHODS FOR BLOCKING CREDIT CARD CHARGES

(71) Applicant: Capital One Services, LLC, McLean, VA (US)

(72) Inventors: Jeffrey Samitt, Glen Allen, VA (US); Zeel Maharshi Jha, Ashburn, VA (US); Colleen Kerr, Washington, DC (US); Henry Feer Joyce, Arlington, VA (US); Joshua M. Wilbur, Potomac, MD (US); John William Schmidt, Falls Church, VA (US); Krystle Voss, Alexandira, VA (US); Riken Shah, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/008,469

(22) Filed: Jun. 14, 2018

(51) Int. Cl.
*G06Q 20/40* (2012.01)

(52) U.S. Cl.
CPC ......... *G06Q 20/407* (2013.01); *G06Q 20/401* (2013.01)

(58) Field of Classification Search
CPC ............................ G06Q 20/00; G06Q 20/401
USPC ........................................................... 705/44
See application file for complete search history.

(56) References Cited

U.S. PATENT DOCUMENTS

| | | | |
|---|---|---|---|
| 2003/0144866 A1* | 7/2003 | Pagliari | G06Q 20/04 705/80 |
| 2012/0116957 A1* | 5/2012 | Zanzot | G06Q 20/10 705/39 |

* cited by examiner

*Primary Examiner* — Robert R Niquette
*Assistant Examiner* — Liz P Nguyen
(74) *Attorney, Agent, or Firm* — Finnegan, Henderson, Farabow, Garrett & Dunner, LLP

(57) ABSTRACT

Systems and methods are provided for blocking charges from a merchant to a payment account of a user. An exemplary system may include one or more memory devices storing instructions and one or more processors configured to execute the instructions to perform various operations. The operations may include receiving, from the user, a dispute request to dispute a charge to the payment account applied by the merchant. In response to the dispute request, the operations may include determining whether to block subsequent charges applied by the merchant to the payment account, based on a history of charging activities of the merchant. Responsive to a determination to block subsequent charges, the operations may include adding the merchant to a block-charge list associated with the payment account.

20 Claims, 10 Drawing Sheets

SYSTEMS AND METHODS FOR BLOCKING CREDIT CARD CHARGES

TECHNICAL FIELD

The present disclosure relates to systems and methods for blocking charges from a merchant to a payment account.

BACKGROUND

Payment cards such as credit cards have been widely used nowadays to facilitate financial transactions. Many people use credit cards to make automatic payments for utility bills, membership dues, newspaper/magazine subscriptions, online services, and other periodic charges. For example, a credit card customer may provide his/her card information to a merchant. The merchant then saves the card information in a bill processing system and charges the card every billing cycle (e.g., every week, month, quarter, year, etc.).

While this automatic payment process provides convenience to the customer, it may also cause problems when, for example, the customer decides to discontinue the automatic payment. In some cases, even if the customer has notified the merchant to stop charging the card, some merchants may continue charging the card using the stored card information. In current payment card systems, the customer must dispute every individual unauthorized charge, after the merchant makes that unauthorized charge, or, must close the card account all together. This causes great inconvenience to the customer.

Thus, there is a need for systems and methods capable of preventively blocking charges from a merchant to a card user's payment account.

SUMMARY

In one aspect, the present disclosure provides a system for blocking charges from a merchant to a payment account of a user. The system may include one or more memory devices storing instructions. The system may also include one or more processors configured to execute the instructions to perform various operations. The operations may include receiving, from the user, a dispute request to dispute a charge to the payment account applied by the merchant. In response to the dispute request, the operations may include determining whether to block subsequent charges applied by the merchant to the payment account, based on a history of charging activities of the merchant. Responsive to a determination to block subsequent charges, the operations may include adding the merchant to a block-charge list associated with the payment account. In addition, the operations may include receiving a transaction authorization request to charge the payment account. The operations may also include determining whether the transaction authorization request is initiated by a merchant listed on the block-charge list. Responsive to a determination that the transaction authorization request is initiated by a merchant listed on the block-charge list, the operations may further include declining the transaction authorization request.

In another aspect, the present disclosure provides a computer-implemented method for blocking charges from a merchant to a payment account of a user. The method may include receiving, from the user, a dispute request to dispute a charge to the payment account applied by the merchant. In response to the dispute request, the method may include determining whether to block subsequent charges applied by the merchant to the payment account, based on a history of charging activities of the merchant. Responsive to a determination to block subsequent charges, the method may include adding the merchant to a block-charge list associated with the payment account. In addition, the method may include receiving a transaction authorization request to charge the payment account. The method may also include determining whether the transaction authorization request is initiated by a merchant listed on the block-charge list. Responsive to a determination that the transaction authorization request is initiated by a merchant listed on the block-charge list, the method may further include declining the transaction authorization request.

In a further aspect, the present disclosure may provide a non-transitory computer-readable medium storing instructions executable by a processor to cause the processor to perform operations for blocking charges from a merchant to a payment account of a user. The operations may include receiving, from the user, a dispute request to dispute a charge to the payment account applied by the merchant. In response to the dispute request, the operations may include determining whether to block subsequent charges applied by the merchant to the payment account, based on a history of charging activities of the merchant. Responsive to a determination to block subsequent charges, the operations may include adding the merchant to a block-charge list associated with the payment account. In addition, the operations may include receiving a transaction authorization request to charge the payment account. The operations may also include determining whether the transaction authorization request is initiated by a merchant listed on the block-charge list. Responsive to a determination that the transaction authorization request is initiated by a merchant listed on the block-charge list, the operations may further include declining the transaction authorization request.

In another aspect, the present disclosure may provide a system for blocking payments to a merchant from a payment account of a user. The system may include one or more memory devices storing instructions. The system may also include one or more processors configured to execute the instructions to perform various operations. The operations may include receiving, from the user, a dispute request to dispute a charge applied by the merchant to the payment account. In response to the dispute request, the operations may include determining whether a reputation score associated with the merchant is below a predetermined threshold. Responsive to a determination that the reputation score associated with the merchant is below the predetermined threshold, the operations may include providing, to the user, an option to block subsequent payments to the merchant from the payment account. The operations may also include receiving, from the user, a block-payment request to block subsequent payments to the merchant from the payment account. Responsive to the reception of the block-payment request, the operations may include adding the merchant to a block list associated with the payment account to block subsequent payments to the merchant from the payment account.

In a further aspect, the present disclosure may provide a computer-implemented method for blocking payments to a merchant from a payment account of a user. The method may include receiving, from the user, a dispute request to dispute a charge applied by the merchant to the payment account. In response to the dispute request, the method may also include determining whether a reputation score associated with the merchant is below a predetermined threshold. Responsive to a determination that the reputation score associated with the merchant is below the predetermined threshold, the method may include providing, to the user, an option to block subsequent payments to the merchant from the payment account. The method may also include receiving, from the user, a block-payment request to block subsequent payments to the merchant from the payment account. Responsive to the reception of the block-payment request, the method may include adding the merchant to a block list associated with the payment account to block subsequent payments to the merchant from the payment account.

In another aspect, the present disclosure may provide a non-transitory computer-readable medium storing instructions executable by a processor to cause the processor to perform operations for blocking payments to a merchant from a payment account of a user. The operations may include receiving, from the user, a dispute request to dispute a charge applied by the merchant to the payment account. In response to the dispute request, the operations may include determining whether a reputation score associated with the merchant is below a predetermined threshold. Responsive to a determination that the reputation score associated with the merchant is below the predetermined threshold, the operations may include providing, to the user, an option to block subsequent payments to the merchant from the payment account. The operations may also include receiving, from the user, a block-payment request to block subsequent payments to the merchant from the payment account. Responsive to the reception of the block-payment request, the operations may include adding the merchant to a block list associated with the payment account to block subsequent payments to the merchant from the payment account.

BRIEF DESCRIPTION OF THE DRAWINGS

The accompanying drawings, which are incorporated in and constitute a part of this specification, illustrate several embodiments and, together with the description, serve to explain the disclosed embodiments. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes systems and methods for blocking charges from a merchant to a payment account of a user. Embodiments of the present disclosure allow the user to preventively block unauthorized charges from a merchant. When blocked, subsequent charges initiated by the merchant may be automatically declined, while charges initiated by non-blocked merchants may still be approved. In some embodiments, the charge-blocking feature may be provided as an option to the user after the user files a dispute against a particular merchant when the merchant has a record of making unauthorized charges.

Figure 1:
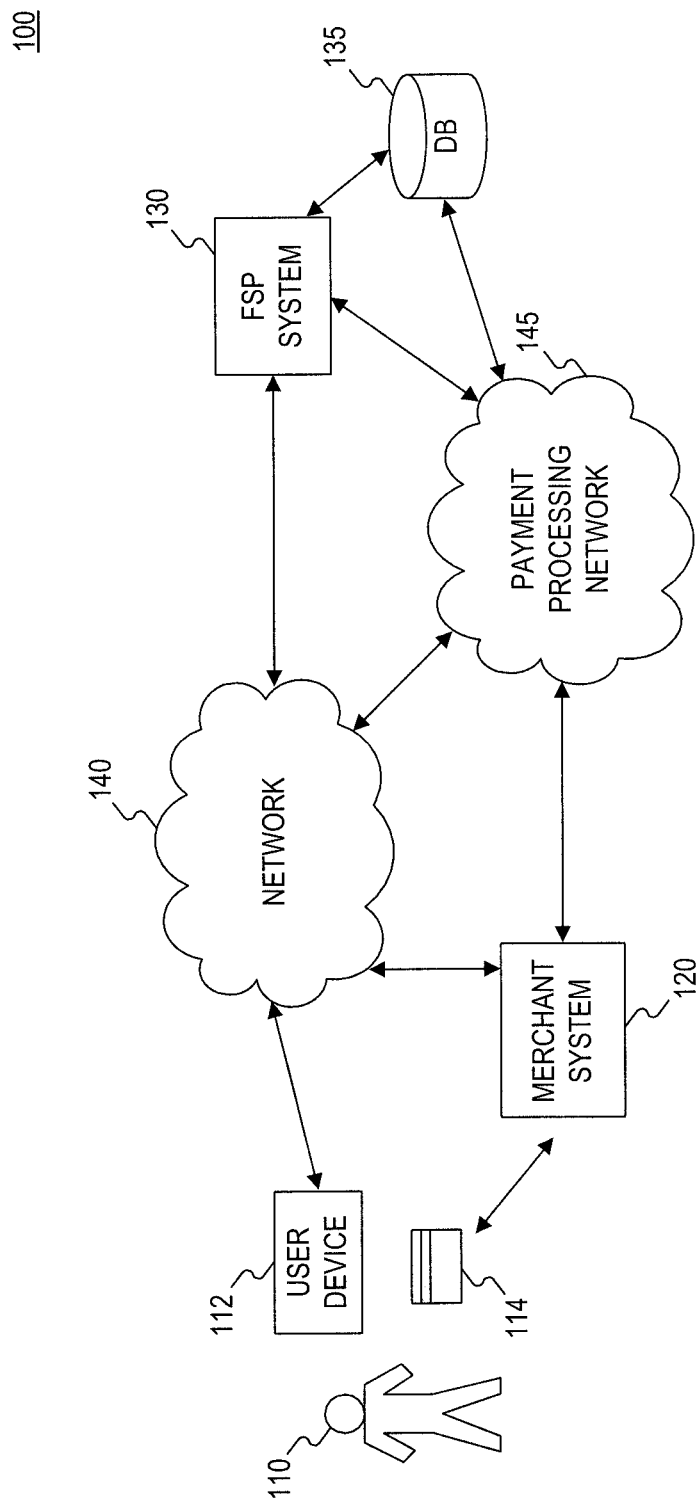
FIG. 1 is a block diagram of an exemplary financial transaction system, consistent with the disclosed embodiments.

FIG. 1 shows a diagram of an exemplary system 100 configured to process financial transactions, in which a charge-blocking feature may be implemented, consistent with disclosed embodiments.

As shown in FIG. 1, system 100 may include a user device 112 and a payment card 114 associated with a payment account of a user 110. For example, the payment account may include a credit card account, a charge card account, a debit card account, etc. Payment card 114 may include a credit card, a charge card, a debit card, etc. System 100 may also include a merchant system 120 with which user 110 may enter into a financial transaction using payment card 114 or user device 112. Merchant system 120 may include a point-of-sale (POS) system, an online payment system, a mobile payment system, etc. Merchant system 120 may communicate with a financial service provider (FSP) system 130 via a transaction processing network 145 to authorize the financial transaction. System 100 may also include a database 135 accessible to FSP system 130 and/or transaction processing network 145 to authorize or otherwise process the transaction, among other things. System 100 may also include a network 140 to facilitate communication among the components of system 100. Network 140 may also facilitate user device 112 to communicate with FSP system 130, for example, to send a request to the financial service provider to block charges from a merchant to his/her payment account associated with the financial service provider.

The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

User 110 may operate user device 112, which may be a desktop computer, laptop, tablet, smartphone, multifunctional watch, pair of multifunctional glasses, tracking device, or any suitable device with computing and communication capability. User device 112 may have a financial application installed thereon, which may enable user device 112 to communicate with FSP system 130 via network 140 and perform aspects of the disclosed embodiments. For example, user device 112 may connect to FSP system 130 through use of browser software, mobile application software, or the like. User device 112 may allow a user to access information stored in FSP system 130, such as, for example, financial information related to purchase transactions, financial statements, account information, rewards program information and the like. An exemplary computer system consistent with user device 112 is discussed in greater detail with respect to FIG. 2.

User 110 may operate user device 112 to perform one or more operations for managing a customer or client account associated with FSP system 130. In some aspects, user 110 may be a customer or client of a financial service provider associated with FSP system 130. For instance, a financial service provider may maintain a payment account (e.g., credit card account, charge card account, checking account, etc.) that user 110 may use to pay a merchant. Consistent with disclosed embodiments, user 110 may operate user device 112 to manage services or features associated with the user's payment account. A financial transaction (which may be in the form of a charge to the user's payment account or a payment to a merchant from the user's payment account) may be initiated by a merchant using merchant system 120 according to any known method, such as presentation of payment card 114 (e.g., a charge card, credit card, debit card, etc.), presentation of payment card information (e.g., providing payment card information to an online shopping portal, a mobile payment system, etc.), use of stored or saved payment card information, etc. Further, user 110 may operate user device 112 to view his/her payment account status report or financial statement provided by the financial service provider associated with FSP system 130, and perform certain requests such as disputing a charge, blocking a merchant from charging the user's payment account, etc.

Payment card 114 may include a physical card, a dongle, a fob, an e-wallet, an electronic device, or other payment device, typically issued by a financial service provider and associated with a customer or client account. Information of payment card 114 may be provided to merchant system 120 to enable automatic payment transactions.

Consistent with disclosed embodiments, FSP system 130 may be a system associated with a financial service provider (not shown), such as a bank, a credit card company, a lender, brokerage firm, or any other type of financial service entity that generates, manages, provides, and maintains one or more payment accounts for user 110. FSP system 130 may include a computing system configured to execute software instructions stored on a memory device to perform operations consistent with the disclosed embodiments. For example, FSP system 130 may include a memory device storing data and software instructions and a processor configured to use the data and execute the software instructions to perform server-based functions and operations known to those skilled in the art. FSP system 130 may include one or more computing components specifically programmed and combined or arranged to perform the disclosed methods.

In certain embodiments, FSP system 130 may be configured as a particular apparatus, system, and the like, based on the storage, execution, and/or implementation of the software instructions that perform operations consistent with the disclosed embodiments. FSP system 130 may be a standalone system, or it may be part of a subsystem, which may be part of a larger system. For example, FSP system 130 may represent distributed servers that are remotely located and communicate over a public network (e.g., network 140) or a dedicated network, such as a LAN, for a financial service provider. An exemplary computing system consistent with FSP system 130 is discussed in additional detail with respect to FIG. 2, below.

FSP system 130 may include or may access one or more storage devices configured to store data and/or software instructions used by one or more processors of FSP system 130 to perform operations consistent with the disclosed embodiments. For example, FSP system 130 may include memory configured to store software program(s) that perform functions when executed by a processor, including functions specific to the disclosed methods.

The disclosed embodiments are not limited to separate programs or computers configured to perform dedicated tasks. For example, FSP system 130 may include memory that stores a single program or multiple programs. Additionally, FSP system 130 may execute one or more programs located remotely from FSP system 130. For example, FSP system 130 may access one or more remote programs stored in memory included with a remote component (such as database 135) that, when executed, perform operations consistent with the disclosed embodiments.

In certain aspects, FSP system 130 and/or database 135 may include server software that generates, maintains, and provides services associated with processing financial transactions. In some embodiments, FSP system 130 may connect with separate server(s) or other computing devices associated with database 135 that generate, maintain, and provide services associated with financial data for a financial service provider associated with FSP system 130. For example, database 135 may include a plurality of storage and processing components and associated software for storing account information of customers or clients of a financial service provider for use in authorizing and processing a transaction. Database 135 may be associated with FSP system 130 and made accessible to transaction processing network 145 for performing various transaction authorization and processing functionality. In some embodiments, database 135 may be provided as part of transaction processing network 145.

Merchant system 120 may be a computing system that is associated with a merchant or other business entity that provides goods and/or services, such as a restaurant, retailer, grocery store, service provider (e.g., utilities, etc.), or any other type of entity that may engage in any financial transaction (e.g., charity, tax collector, etc.) or other commercial transaction with a consumer, including health care providers, education providers, etc. While system 100 is shown with one merchant system 120 for ease of discussion, the disclosed embodiments may also be implemented in a system 100 including two or more merchant systems 120 associated with any number of underlying entities (commercial or otherwise). Further, merchant system 120 is not limited to conducting business in any particular industry or field.

Merchant system 120 may be associated with a physical "brick-and-mortar" location that user 110 may physically visit to purchase goods and/or services. Such physical locations may include computing devices that perform financial service transactions with consumers (e.g., POS terminals, kiosks, etc.). Merchant system 120 may also be associated with a merchant that provides goods and/or services via online or e-commerce types of systems. For example, such a merchant may sell goods/services or otherwise accept payment via a website or mobile application using online or e-commerce systems to market, sell, and process online transactions conducted via network 140, for example.

In one embodiment, merchant system 120 may include one or more servers or other type of computer devices. The merchant system server(s) may be one or more computing devices configured to execute software instructions stored in memory to perform processes consistent with the disclosed embodiments. For example, merchant system 120 may include one or more memory device(s) storing data and software instructions, and one or more processor(s) configured to use the data and execute the software instructions to perform server-based functions and operations known to those skilled in the art.

Merchant system 120 may further include server(s) that are configured to execute stored software instructions to perform operations associated with a merchant, including one or more processes associated with pre-authorization and processing of financial transactions, generating transaction data (e.g., merchant name and location identifiers), and generating product data (e.g., SKU data) relating to financial transactions, etc. Merchant system 120 may include one or more servers implemented by, for example, a general-purpose computer, a mainframe computer, or any combination of these components. In certain embodiments, merchant system 120 (or a system including merchant system 120) may be configured as a particular apparatus, system, and the like based on the storage, execution, and/or implementation of the software instructions that perform operations consistent with the disclosed embodiments. A merchant server may be standalone system, or it may be a subsystem, which may be part of a larger system. For example, a merchant server may represent distributed servers that are remotely located and communicate over a public network (e.g., network 140) or a dedicated network, such as a LAN. An exemplary computing system consistent with merchant system 120 is discussed in additional detail with respect to FIG. 2.

In certain aspects, merchant system 120 may include one or more web servers that execute software to generate, maintain, and provide a web site(s) for a respective merchant that is accessible over network 140. In other aspects, a merchant system 120 may connect separately to web server(s) or similar computing devices that generate, maintain, and provide a web site(s) for a merchant.

In certain embodiments, a merchant may operate computing components associated with merchant system 120 to perform processes consistent with the disclosed embodiments. For example, merchant system 120 may be configured to execute software instructions to provide transaction data and/or other data relating to financial transactions to FSP system 130 over network 140 or transaction processing network 145. Additionally, merchant system 120 may be configured to execute software instructions to perform pre-authorization and other transaction processing operations regarding a financial transaction entered into using a financial service account associated with FSP system 130. These processes may be performed using a transaction-processing network 145 that may be in communication with FSP system 130 and database 135.

Transaction-processing network 145 may include a plurality of computing components, systems, and subsystems in communication with merchant system 120, FSP system 130, and database 135 for processing a financial transaction. For conciseness, transaction-processing network 145 may include any configuration or combination of known transaction-processing networks and systems implemented for authorizing, clearing, and settling a financial transaction. Transaction-processing network 145 may generally include the underlying systems for receiving a transaction authorization request from a merchant system 120, performing verification and fraud analysis on the transaction request, communicating with FSP system 130 associated with the transaction request, providing an authorization decision to merchant system 120, clearing an authorized transaction, and settling the transaction through the payment of funds or otherwise. In some embodiments, transaction-processing network 145 may include a number of additional systems (not shown), such as a financial service provider system associated with merchant system 120, a third party transaction processor system, a card network and processing system (e.g., such as Visa, MasterCard, etc.) and other systems related to processing financial transactions. In some embodiments, aspects of transaction-processing network 145 may include aspects of network 140 for the communication of various transaction data or other communications between various systems of transaction-processing network 145.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of system 100. Network 140 may also include a public switched telephone network ("PSTN") and/or a wireless cellular network. Network 140 may be a secured network or unsecured network. In some embodiments, one or more components of system 100 may communicate directly through a dedicated communication link(s), such as links between FSP system 130 and merchant system 120.

Other components known to one of ordinary skill in the art may be included in system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including close range communication protocols, such as those employed under the name BLUETOOTH™ or BLUETOOTH LE™, and Wi-Fi, or any known near field communications (NFC) techniques, or other suitable communication methods that provide a medium for transmitting data between separate devices.

Figure 2:
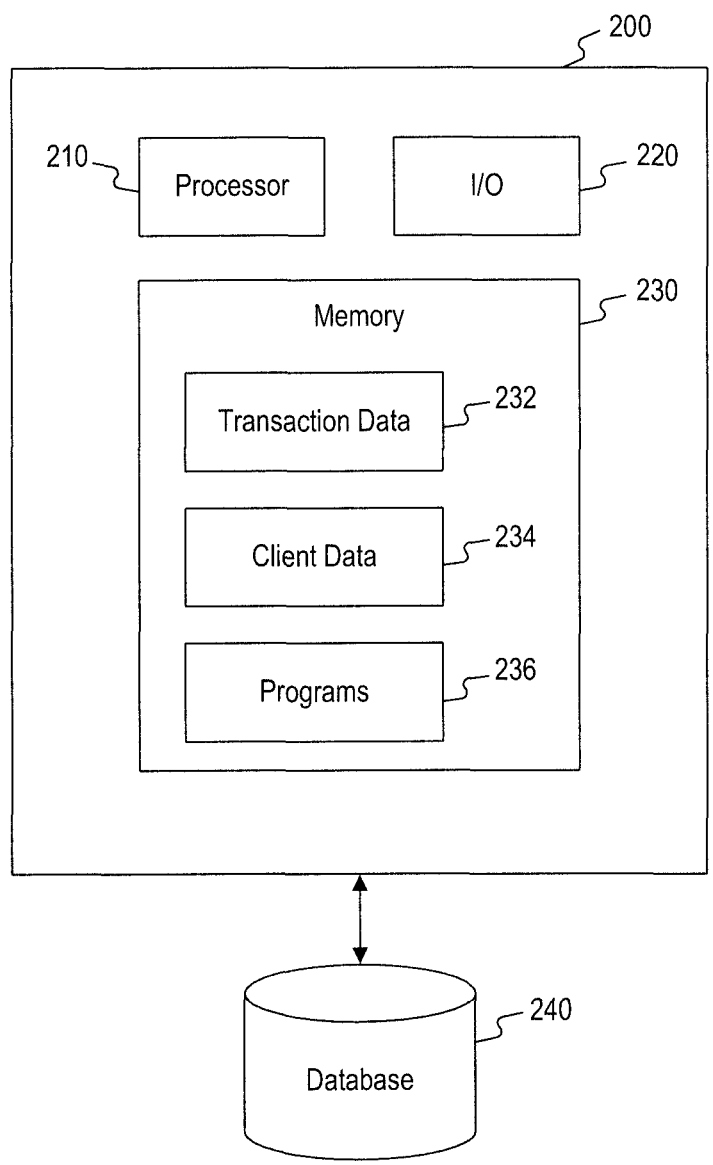
FIG. 2 is a block diagram of an exemplary computing system, consistent with the disclosed embodiments.

System 100 includes a number of components generally described as computing devices. Each of the computing devices may include any number of computing components particularly configured as general- or special-purpose computing device to perform the functionality disclosed herein. FIG. 2 shows a diagram of an exemplary computing system 200 illustrating a computing system configuration that may be associated with FSP system 130, merchant system 120, one or more payment processing systems provided as part of transaction-processing network 145, and/or user device 112, consistent with the disclosed embodiments.

In one embodiment, computing system 200 may include one or more processors 210, one or more memories 230, and one or more input/output (I/O) devices 220. In some embodiments, computing system 200 may take the form of a server, specially programmed computer, mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone system, or it may be a subsystem, which may be part of a larger system.

Processor 210 may include one or more known processing devices, such as a microprocessor from the Pentium™ or Xeon™ family manufactured by Intel™, the Turion™ family manufactured by AMD™ or any of various processors manufactured by Sun Microsystems, for example. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform operations associated with the disclosed embodiments. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP system 130, merchant system 120, or user device 112, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute operations related to financial services provided to users including, but not limited to, processing credit and debit card transactions, checking transactions, fund deposits and withdrawals, transferring money between financial accounts, lending loans, processing payments for credit card and loan accounts, and generating and associating block-charge lists to one or more accounts according to the disclosed embodiments.

Memory 230 may also store data that may reflect any type of information in any format that the system may use to perform operations consistent with the disclosed embodiments. Memory 230 may store instructions to enable processor 210 to execute applications, such as server applications, network communication processes, and any other type of application or software, including software directed to blocking charges from a merchant to a user's payment account according to the disclosed embodiments. Alternatively, the instructions, application programs, etc., may be stored in an external storage (such as database 240) in communication with computing system 200 via network 140 or any other suitable network. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Memory 230 may include transaction data 232. Transaction data 232 may include information related to purchase or payment transactions initiated by user 110 and/or a merchant associated with merchant system 120. For example, transaction data may include a user identifier ("ID"), a merchant identifier, a country code or location code indicating the geographic region of the merchant, a transaction amount, and any other relevant transaction- or merchant-specific information. The user identifier may be a credit or charge card number, an account number, or other means for identifying the user initiating the transaction. The merchant identifier may include the name of the merchant, an identification number of the merchant, a registered phone number of the merchant, or other means for identifying the merchant initiating the transaction. The transaction amount may include a value representing the total amount of cash requested by the user and/or merchant. In other embodiments, transaction data 232 may include other general information related to the transaction including the time and date of the transaction, reason for the transaction, etc.

In some embodiments, merchant system 120 may collect, generate, and provide transaction data relating to purchase transactions involving a user to FSP system 130 and/or other systems provided as part of transaction processing network 145. Merchant system 120 may provide the transaction data to FSP system 130 via transaction processing network 145 or network 140. Alternatively, transaction data 232 may be stored in database 240, which may be an external storage device in communication with computing system 200 via network 140 or any other suitable network including transaction processing network 145.

Memory 230 may further include client data 234, which may include information about individual clients of the financial service provider. For example, client data 234 may include client account information, credit or debit card information, history of purchase and/or payment transactions, financial statements, and block-charge lists consistent with the disclosed embodiments. Client data 234 may include a data record associating a user account with one or more merchants according to the block-charge lists. Client data 234 may further contain user profiles corresponding to individual client accounts. In some embodiments, client data 234 may be stored in database 240, which may be an external storage device in communication with computing system 200 via network 140 or any other suitable network including transaction processing network 145. In some embodiments, client data 234 may include merchant data, such as a history of charging activities of a merchant.

Processor 210, upon execution of programs 236, may perform the functionality of the disclosed embodiments for blocking charges from a merchant to a payment account of a user. In the disclosed embodiments, processor 210 may analyze received transaction data 232 in reference to client data 234 to perform the disclosed functionality.

For example, processor 210 may analyze transaction data to determine which merchant having information stored in client information 234 is initiating the transaction. Additionally, processor 210 may compare the merchant's identification information with a block-charge list in association with client data 234 to determine whether the transaction should be authorized. In some embodiments, processor 210 may provide a user an option to block charges from a particular merchant, receive a confirmation from the user to block the charges from the merchant, and add the merchant to a block-charge list associated with the user account in client data 234 to update the client account information accordingly. Processor 210 may also access data records stored as client data 234 to determine user account information, debit or credit card information, history of purchase transactions, financial statements and/or one or more block-charge lists associated with a user account. Other programmable functions of processor 210 are described in greater detail below.

I/O devices 220 may include one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as keyboards, mouse devices, touch screens, and the like, which may enable computing system 200 to receive input from an operator of FSP system 130 (not shown) or from user 110.

Computing system 200 may also contain one or more database(s) 240, or may be communicatively connected to database(s) 240 through a direct connection and/or a network (e.g., network 140, transaction processing network 145, etc.). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

As discussed above, FSP system 130 may include at least one computing system 200. Further, although sometimes discussed here in relation to FSP system 130, it should be understood that variations of computing system 200 may be implemented in other components of system 100, including merchant system 120, aspects of transaction processing network 145, and user device 112. Computing system 200 may be a single server or may be configured as a distributed computer system including multiple servers or computers that interoperate to perform processes and functionalities associated with the disclosed embodiments.

In some embodiments, merchant system 120 may include the same or similar configuration and/or components of computing system 200. Computing system 200 when implemented in merchant system 120 may include any hardware and/or software installed therein necessary for performing methods and processes of the disclosed embodiments.

The following processes are directed to various embodiments for blocking charges from a merchant to a payment account of a user. As used herein, the term "block" refers to a real-time or near real-time decline or rejection of a transaction authorization request initiated by a merchant (e.g., a merchant associated with merchant system 120) to charge a user's payment account (e.g., user 110's payment account associated with payment card 114). In this disclosure, the term "block," "decline," and "reject" are used interchangeably.

In some cases, a merchant may initiate a transaction authorization request to charge a user's payment account based on saved or stored payment account information. For example, user 110 may provide payment account information associated with payment card 114 (e.g., credit card number, expiration date, billing address, account holder name, "card verification value (CVV)" number, etc.) to a merchant (e.g., a sports club) to start a free trial of a service (e.g., gym membership). The merchant may then save the payment account information in their system. Toward the end of the trial period or after the end of the trial period, the merchant may charge membership fees using the stored payment account information. User 110 may wish to discontinue the membership. For example, user 110 may inform the merchant to cancel the membership and stop any pending or future payment. For various reasons, the merchant may continue charging user 110's payment account using the stored payment account information. After each charge is made, user 110 may dispute the charge by communicating with the financial service provider, e.g., the card issuer. The financial service provider may then investigate the charge and credit the charged amount back to user 110's payment account if the charge is indeed unauthorized. If the merchant again makes such similar charges to user 110's payment account, user 110 may have to undergo the dispute process again for each of the charges. In other words, the conventional dispute process is an "after-the-fact" remedial method, which is not capable of preventing the merchant from making future or subsequent charges to the payment account, even though in some cases future occurrences of such unauthorized charges are highly probable.

Systems and methods disclosed in this application may preventively block future or subsequent unauthorized charges from a particular merchant based on certain criteria. In other words, embodiments disclosed herein provide "before-the-fact" preventive methods to relieve user 110 from undergoing repeated dispute procedures. In some embodiments, once a particular merchant has been identified as making repeated unauthorized charges to user 110 or to a group of users in general, the merchant can be flagged or tagged (e.g., added to a block-charge list associated with user 110's payment account), such that future charges from that merchant to the payment account of user 110 would be automatically blocked.

In some embodiments, FSP system 130 may be configured to block subsequent charges from a merchant to user 110's payment account after user 110 files a dispute against the merchant regarding a charge previously applied or charged by that merchant to his/her payment account. In particular, the processes of some embodiments implement a reputation-based block-charge list to prevent a particular merchant from charging the user's payment account once that merchant has been added to the block-charge list.

The following processes are exemplary implementations of blocking unauthorized charges initiated by a merchant. These processes may be performed by various aspects and components of system 100 and computing system 200, as is apparent from the disclosure.

Figure 3:
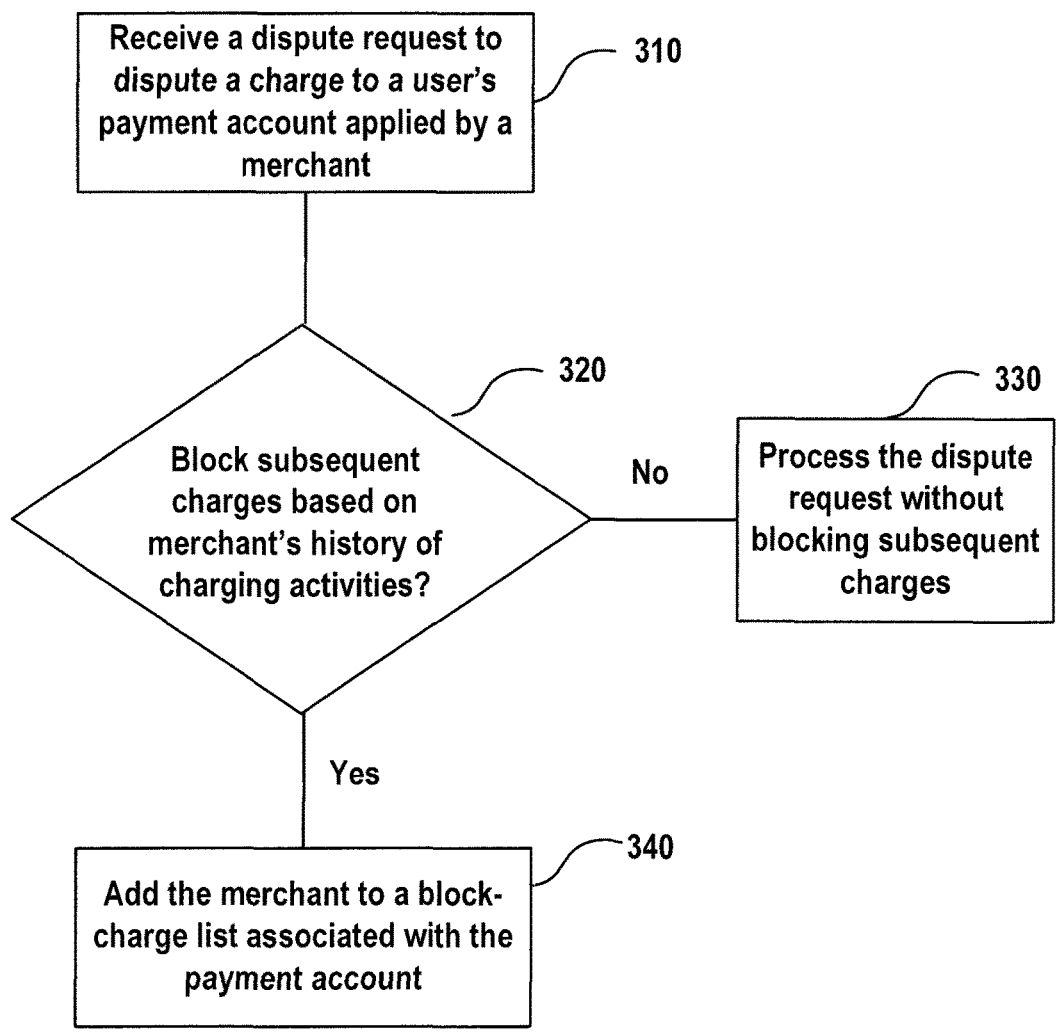
FIGS. 3-6 are flowcharts of exemplary processes for blocking charges to a payment account, consistent with the disclosed embodiments.

FIG. 3 is a flowchart of an exemplary process 300 for blocking charges from a merchant to a payment account of a user, such as user 110, consistent with disclosed embodiments. In step 310, FSP system 130 may receive a dispute request from user 110 to dispute a charge to user 110's payment account applied or charged by a merchant, such as the merchant associated with merchant system 120. In some embodiments, user 110 may file the dispute request by calling a customer service number of the financial service provider associated with FSP system 130 (e.g., the card issuer of user 110's payment card 112). In this case, a customer service representative may communicate with user 110 to obtain dispute information such as merchant name, transaction or charge details (e.g., date, amount, location, etc.), reason for the dispute, etc., and input the dispute information into FSP system 130. After receiving the dispute information, FSP system 130 may process the dispute information and provide feedback to the customer service representative if an option is available for blocking subsequent charges from the merchant to user 110's payment account. In some embodiments, user 110 may file the dispute request through an online portal, for example, a website of the financial service provider or a mobile application. For example, user 110 may identify a transaction applied by a merchant for dispute from his/her payment account activities using the website or mobile application, and select a dispute option to initiate the dispute request. User 110 may input dispute information through the online portal and submit the dispute request along with the dispute information to FSP system 130. FSP system 130 may process the dispute information and may inform user 110 when an option is available for blocking subsequent charges from the merchant.

In step 320, FSP system 130 may, in response to the dispute request, determine whether to block subsequent charges initiated by the merchant to user 110's payment account based on a history of charging activities of the merchant. For example, FSP system 130 may identify the merchant based on the dispute request. The dispute request may include a transaction charged by the merchant, and may include merchant information such as merchant name, merchant ID, merchant address, merchant phone number, etc. Based on such information, FSP system 130 may identify the merchant. In some embodiments, the merchant information may be input to FSP system 130 when, for example, the dispute is filed by user 110 through calling a customer service number of the financial service provider and communicating with a customer service representative. In this case, the customer service representative may input the merchant information into FSP system 130.

After FSP system 130 identifies the merchant, FSP system 130 may determine a history of charging activities of the merchant. In some embodiments, the history of charging activities may include a total number of dispute requests received against the merchant. In this case, FSP system 130 may search a dispute database (e.g., part of database 135 or 240) using the merchant's identification information and identify dispute requests filed by multiple users against the merchant. The search may provide a total number of dispute requests filed against the merchant based on one or more criteria, such as over a predetermined period of time, within a set geographic area, for a particular category of goods/services, whether the merchant won or lost the disputes, the disputed charge amounts, etc. For example, FSP system 130 may obtain a total number of dispute requests filed by users living in a city against the merchant in the past two years. In another example, FSP system 130 may obtain the total number of dispute requests filed against the merchant and the merchant lost in those disputes. In another example, FSP system 130 may obtain the total number of dispute requests filed against the merchant disputing membership fee charges. Other criteria or combinations of criteria may also be used depending on particular situation.

After FSP system 130 obtain the total number of dispute requests subject to one or more suitable criteria, FSP system 130 may compare the number with a predetermined threshold. If the number exceeds the predetermined threshold, FSP system may determine to block subsequent charges applied or initiated by the merchant to user 110's payment account. For example, the predetermined threshold may be 10, 20, or any suitable number.

In some embodiments, instead of or in addition to obtaining the total number of dispute requests filed against the merchant by multiple users, FSP system 130 may search the dispute database and identify the number of dispute requests filed by a particular user, such as user 110 who files the dispute request in step 310. In this case, FSP system 130 may evaluate whether the merchant repeatedly makes unauthorized charges to user 110's payment account. FSP system 130 may obtain the number of dispute requests against the merchant received from user 110 based on similar criteria as discussed above.

After FSP system 130 obtain the number of dispute requests received from user 110, subject to one or more suitable criteria, FSP system 130 may compare the number with another predetermined threshold. If the number exceeds the predetermined threshold, FSP system may determine to block subsequent charges applied or initiated by the merchant to user 110's payment account. For example, the predetermined threshold may be 3, 5, or any suitable number of dispute requests. In some embodiments, the predetermined threshold used for comparing with the number of dispute requests received from user 110 may be lower than the predetermined threshold used from comparing with the total number of dispute requests received from multiple users.

In some embodiments, the history of charging activities may include a number of repeated charges applied by the merchant to user 110's payment account. For example, FSP system 130 may search the dispute database for those disputes against the merchant where the disputed charges are repeated charges. The repeated charges may have similar amounts, charged repeated according to certain charging cycles, or resemble other types of similarities. For instance, the merchant may charge user 110 membership fee every month using his/her credit card information stored on the merchant's billing system, despite the fact that user 110 has cancelled the membership. User 110 may have disputed the monthly charge every time. This pattern of repeated charging and disputing activities may be obtained from user 110's account activity history and used by FSP system 130 as a basis for blocking merchant from making subsequent charges. For example, if the number of repeated charges exceeds a predetermined threshold, FSP system 130 may determine to block subsequent charges initiated or applied by the merchant.

After FSP system 130 determines to block subsequent charges from the merchant (step 320: Yes), FSP system 130 may add the merchant to a block-charge list associated with user 110's payment account in step 340. For example, FSP system 130 may determine a merchant identifier, such as the merchant's name, a merchant code, a phone number of the merchant, an address of the merchant, or other data that identifies the merchant. FSP system 130 may determine the merchant identifier based on the dispute request, merchant record (e.g., from client data 234, stored in database 240 or 135), the history of charging activities, etc. FSP system may then add the merchant identifier to the block-charge list. The block-charge list may be associated with individual user's payment account. For example, each user may has his/her own block-charge list including one or more merchants that previously made unauthorized charges to that user's payment account and underwent at least one dispute process. In some embodiments, a merchant may be removed from the block-charge list after a predetermined period of time, such as 6 months, 1 year, etc.

In some embodiments, user 110 may be provided with a choice to accept or decline the option of blocking subsequent charges from the merchant. For example, FSP system 130 may inform a customer service representative about the blocking option, and the customer service representative may communicate with user 110 about the option and obtain user 110's verbal confirmation about whether to accept or decline the option. The customer service representative may then input the user's choice to FSP system 130. FSP system 130 may then add the merchant to the block-charge list after receiving the confirmation that user 110 accepts the blocking option. In another example, FSP system 130 may provide instructions to user device 112 for displaying an application user interface to receive user input as to whether to accept of decline the blocking option. After receiving user input indicating the user 110 accepts the blocking option, FSP system 130 may then add the merchant to the block-charge list associated with user 110's payment account.

If FSP system 130 determines not to block subsequent charges from the merchant (step 320: No), FSP system 130 may process the dispute request according to any known methods without blocking subsequent charges from the merchant, as shown in step 330.

Figure 4:
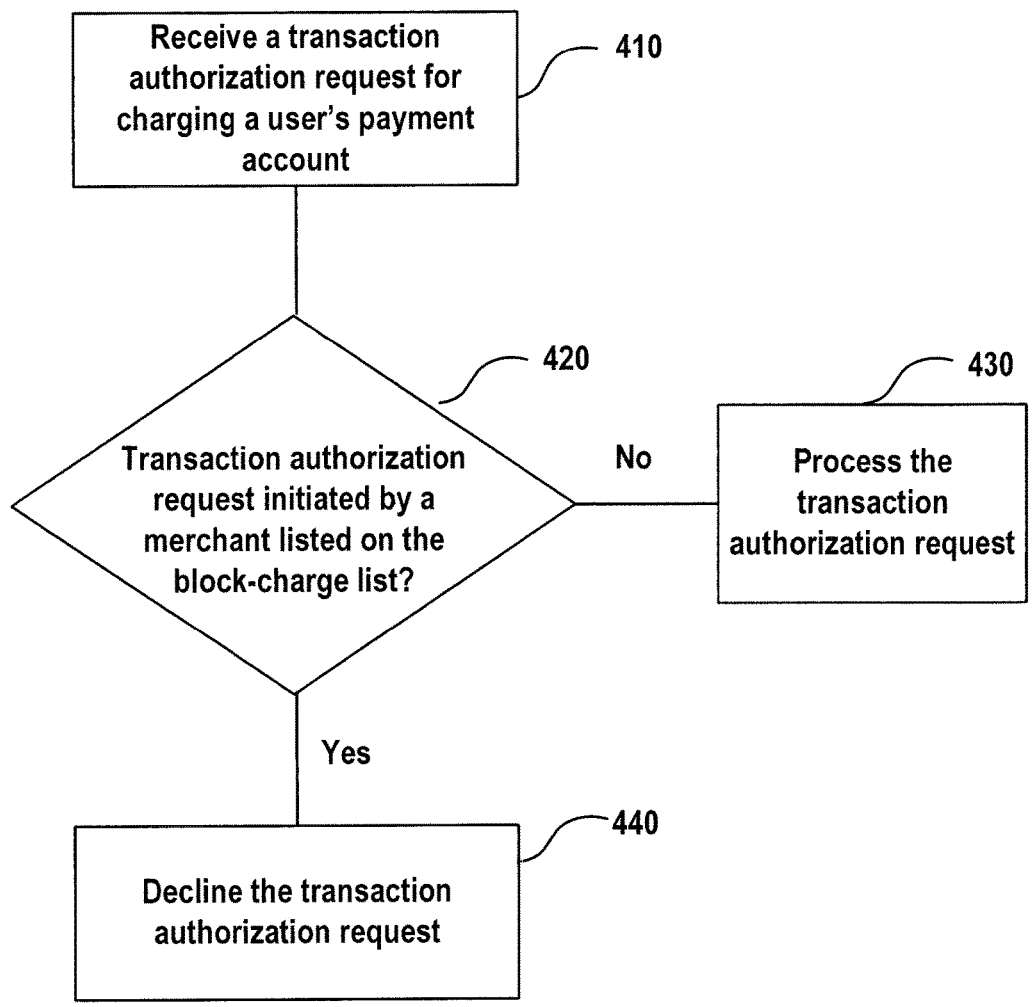

FIG. 4 is a flow chart of an exemplary process 400 for blocking a charge from a merchant that is on the block-charge list associated with a payment account of a user, such as user 110. In step 410, FSP system 130 may receive a transaction authorization request for charging user 110's payment account. For example, the merchant associated with merchant system 120 may initiate the transaction authorization request charging user 110's payment account using the account information saved on merchant system 120. The transaction authorization request may be initiated at merchant system 120 and received by FSP system 130 through transaction processing network 145 and/or network 140.

Figure 5:
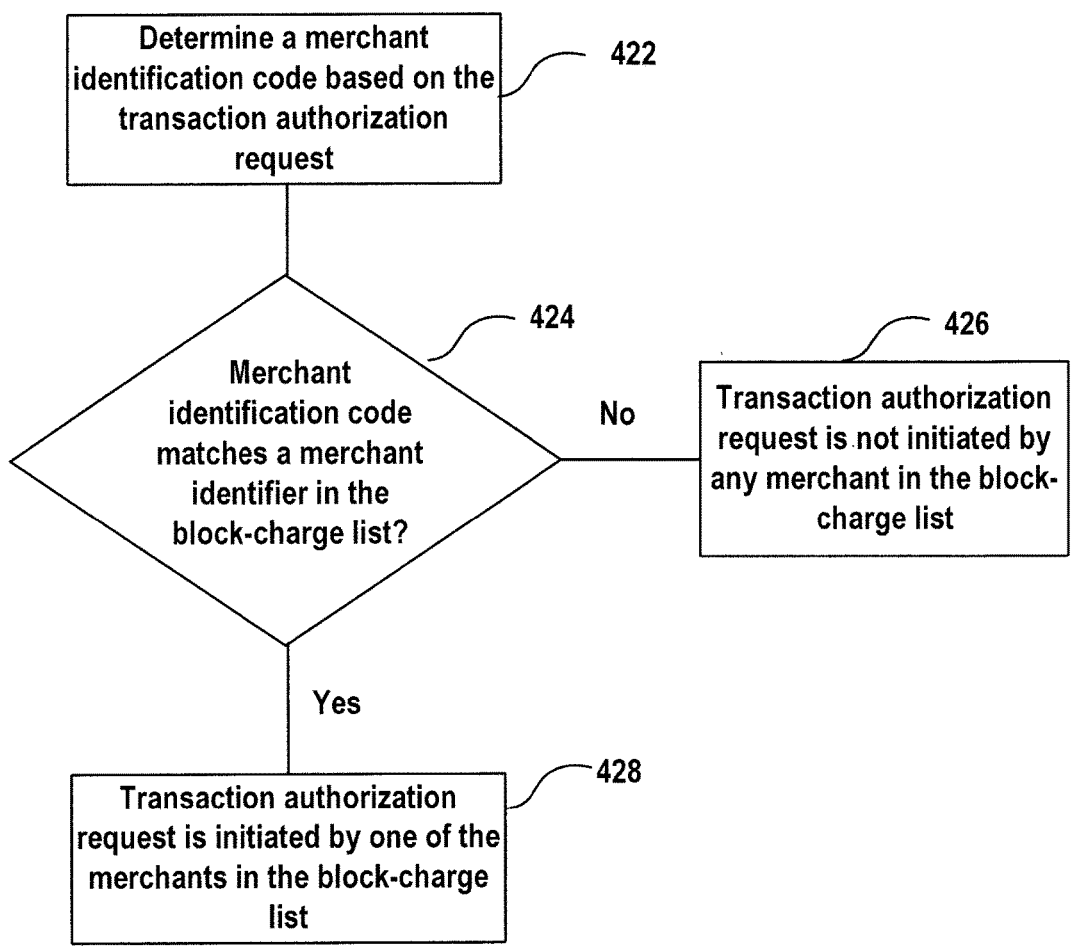

After receiving the transaction authorization request, FSP system 130, in step 420, may determine whether the transaction authorization request is initiated by a merchant listed on the block-charge list. FIG. 5 shows an exemplary implementation of step 420. Referring to FIG. 5, FSP system 130 may determine a merchant identification code based on the transaction authorization request in step 422. The merchant identification code may include any form of identification information that identifies the merchant that initiates the transaction authorization request. For example, the merchant identification code may include the merchant name, merchant code, merchant phone number, address, etc. In step 424, FSP system 130 may compare the merchant identification code with the merchant identifier(s) in the block-charge list and determine if the merchant identification code matches any merchant identifier on the block-charge list. If a match is found (step 424: Yes), the process proceeds to step 428, in which FSP system 130 may determine that the transaction authorization request is initiated by one of the merchants in the block-charge list. If the merchant identification code does not match any merchant identifier on the block-charge list (step 424: No), the process proceeds to step 426, in which FSP system 130 may determine that the transaction authorization request is not initiated by any merchant in the block-charge list.

Returning to FIG. 4, if FSP system determines that the transaction authorization request is initiated by a merchant listed on the block-charge list (step 420: Yes), then process 400 proceeds to step 440, in which FSP system 130 may decline the transaction authorization request, therefore blocking the merchant's charging request and preventing the merchant from making any subsequent charges to the user's payment account. If FSP system determines that the transaction authorization request is not initiated by any merchant in the block-charge list (step 420: No), then process 400 proceeds to step 430, in which FSP system 130 may process the transaction authorization request according to any known methods, including approving the transaction authorization request.

Figure 6:
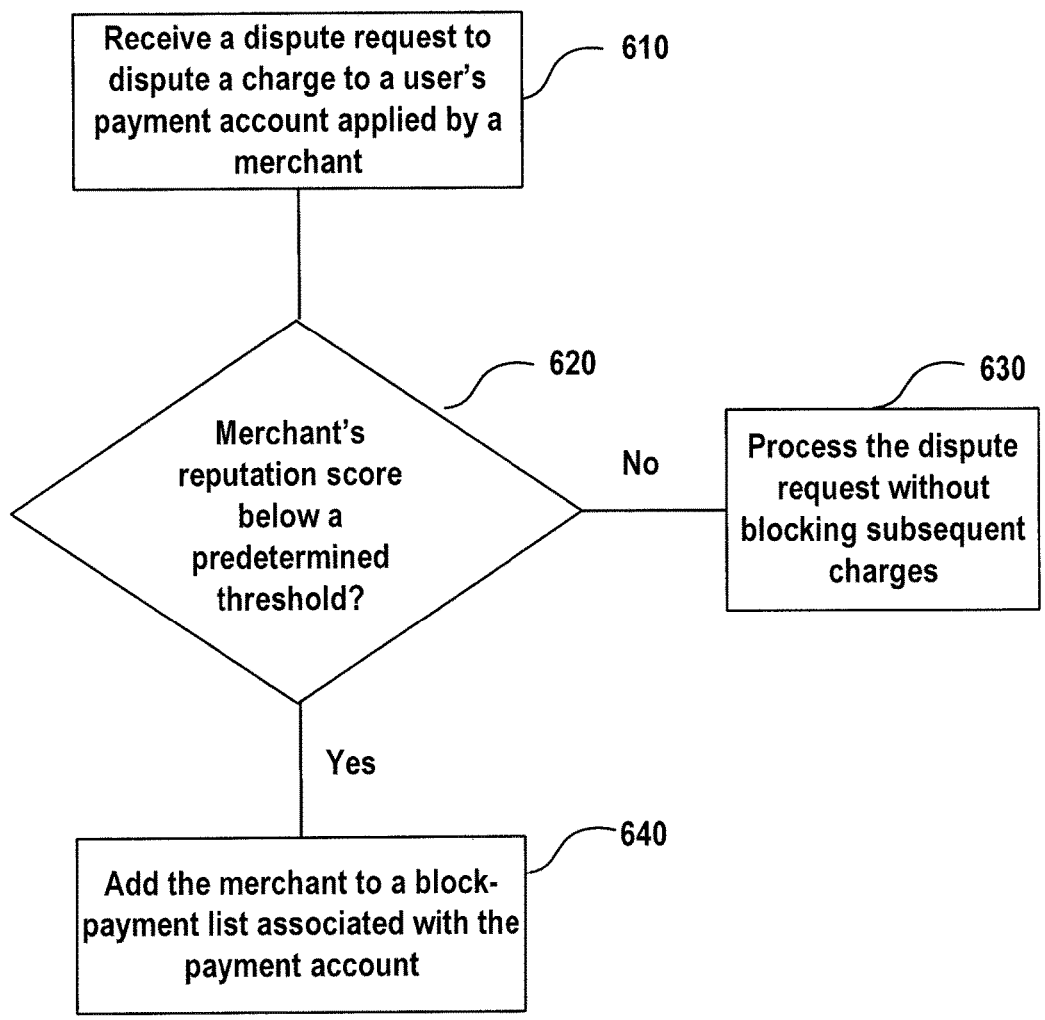

FIG. 6 is a flow chart of another exemplary process 600 for blocking payments to a merchant from a payment account of a user, such as user 110. In step 610, FSP system 130 may receive a dispute request from user 110 to dispute a charge to user 110's payment account applied or charged by a merchant. Step 610 is similar to step 310. In step 620, FSP system 130 may determine whether the merchant's reputation score is below a predetermine threshold. A reputation score may be used to measure the reputation of a merchant in terms of its tendency to make unauthorized charges. The reputation score may take any suitable form, such as a number ranging from 0 to 100 or 1 to 5, or a letter score from A to F, and may include half step indicators such as "+" and "−". For example, a score of 100, A, A+, 5, etc., may indicate that the merchant has an outstanding reputation and may never receive dispute requests against it or may never lose any dispute. On the other hand, a score of 0, F, F−, 1, etc., may indicate that the merchant has a high risk of making unauthorized charges and may receive a large number of disputes against it or may lose a large number of disputes. In some embodiments, the reputation score may be determined based on the total number of dispute requests received against the merchant, where a higher total number of dispute requests corresponds to a lower reputation score. In some embodiments, the reputation score may be determined based on the number of disputes received from a particular user, such as user 110, against the merchant, where a higher number of dispute requests corresponds to a lower reputation score. In this case, the reputation score of a merchant may be individually determined for each particular user.

In some embodiments, after receiving the dispute request in step 610, FSP system may update the reputation score of the merchant that is the subject of the dispute. For example, FSP system may adjust the reputation score based on the dispute received in step 610 (e.g., lowering the score). In some embodiments, FSP system 130 may update the reputation score periodically.

FSP system 130 may compare the reputation score of the merchant with a predetermined threshold to determine whether to add the merchant to a block-payment list, thereby blocking subsequent charges from the merchant to the user's payment account. The block-payment list is similar to the block-charge list discussed above. For example, the predetermine threshold may be set according to the specific form of the reputation score. If a reputation score is below the threshold, it may indicate that there is a relatively high risk that the merchant will make subsequent unauthorized charges to the user's payment account. Therefore, the reputation score and the threshold may be used by FSP system 130 to determine whether to add the merchant to the block-payment list to block subsequent payment to the merchant from the user's payment account. If the reputation score of the merchant is not below the predetermined threshold (step 620: No), process 600 proceeds to step 630, in which FSP system 130 may process the dispute without blocking subsequent charges from the merchant to user 110's payment account. Step 630 is similar to step 330. If the reputation score is below the predetermined threshold (step 620: Yes), process 600 proceeds to step 640, in which FSP system 130 may add the merchant to a block-payment list associated with the payment account of user 110. Step 640 is similar to step 340.

Similar to process 300, user 110 may be provided with a choice to accept or decline the option of blocking subsequent charges from the merchant. In some embodiments, FSP system 130 may add the merchant to the block-payment list after receiving confirmation from user 110 indicating the user 110 accept the blocking option.

After a merchant is added to the block-payment list according to its reputation score, subsequent charges initiated by the merchant to request payment from the user's payment account may be automatically declined. For example, process 400 discussed above in connection with FIGS. 4 and 5 may be used to process and/or block subsequent transaction authorization requests charging the user's payment account.

FIGS. 7A-7D show a series of exemplary application interfaces that are configured to allow a user 110 to accept or decline the option of blocking subsequent charges from a merchant. The exemplary application interfaces may be part of a mobile application installed on user device 112, or may be implemented as part of a website or web portal that can be accessed by user 110 using a browser software application.

Figure 7A:
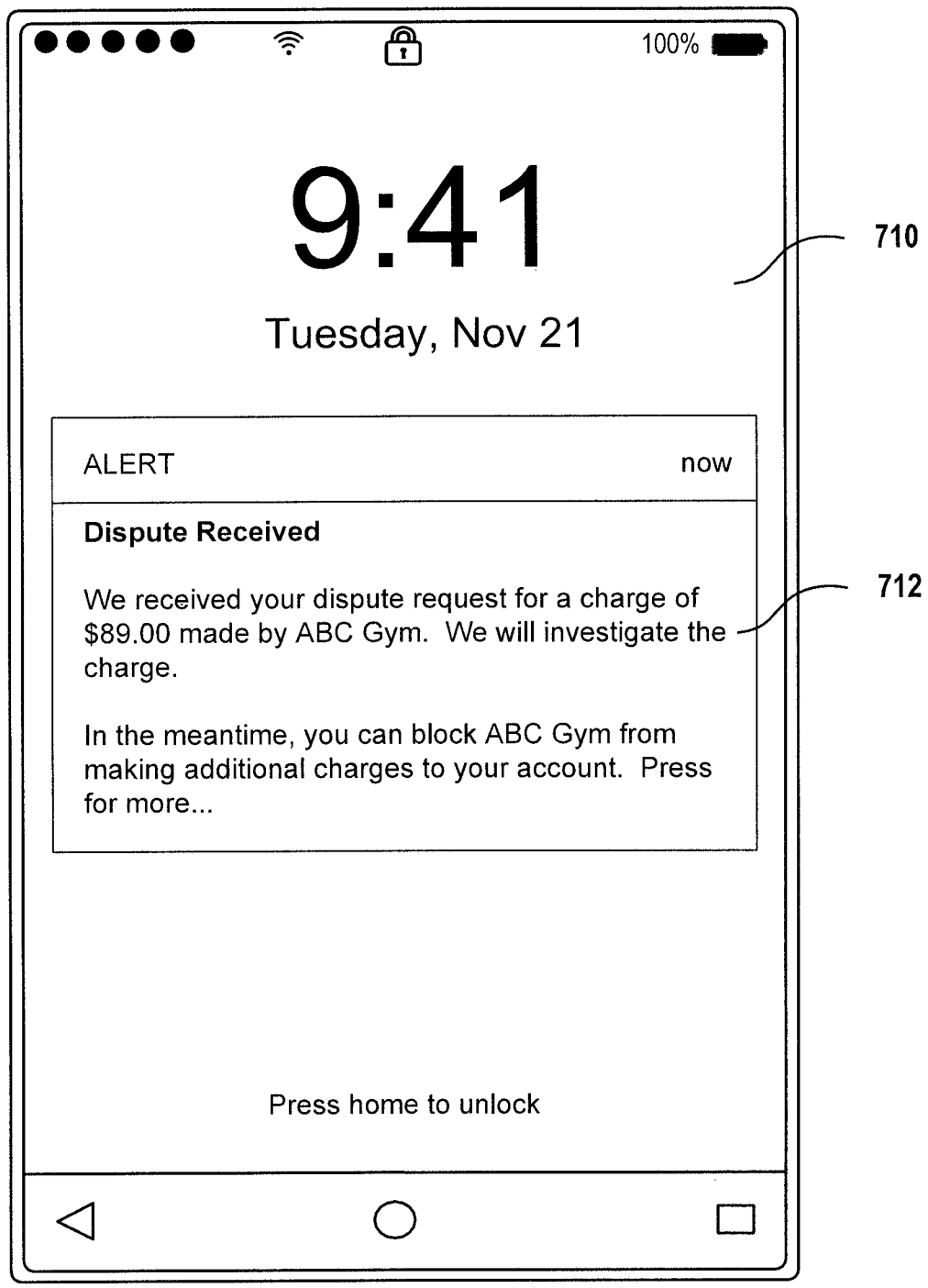
FIGS. 7A-7D are exemplary user device interfaces configured to receive user inputs to block charges to a payment account, consistent with the disclosed embodiments.

FIG. 7A shows an interface displaying an alert message 712 informing the user that a dispute request against a merchant has been received and providing the user with an option to block additional charges from that merchant. In some embodiments, alert message 712 may be displayed on a lock screen 710 of user device 112, so that user 110 may receive the alert even if the user is not logged in to the mobile application or a website associated with the user's payment account. The user may be provided with a control option to block charges from the merchant by, for example, pressing the alert message, as shown in FIG. 7A. Specifically, after the user presses alert message 712, an interface shown in FIG. 7B may be displayed, in which a message 720 is provided to the user inquiring whether to block the merchant. The user may accept the blocking option by pressing button 722, or declining the blocking option by pressing button 724.

Figure 7B:
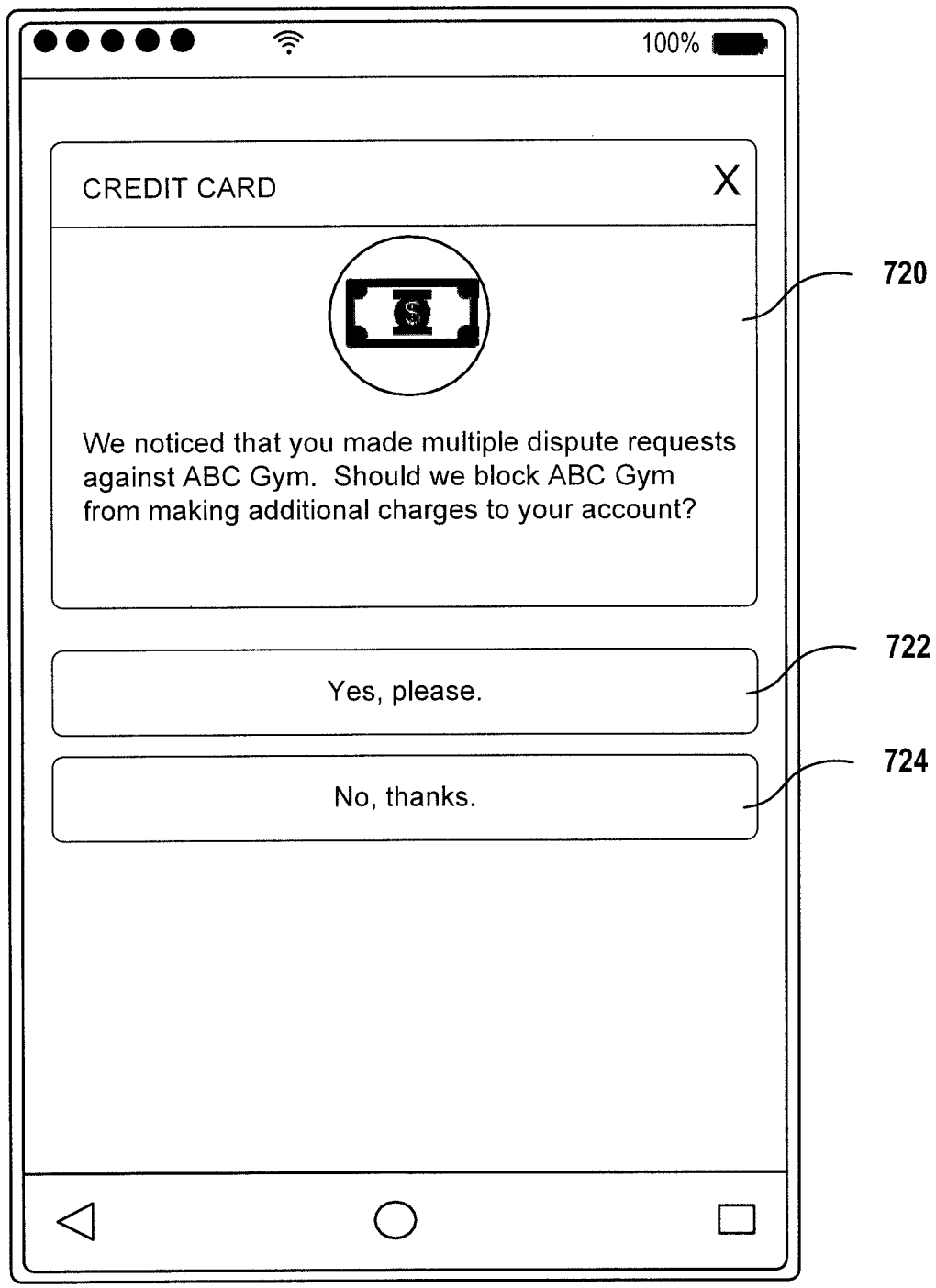
Figure 7C:
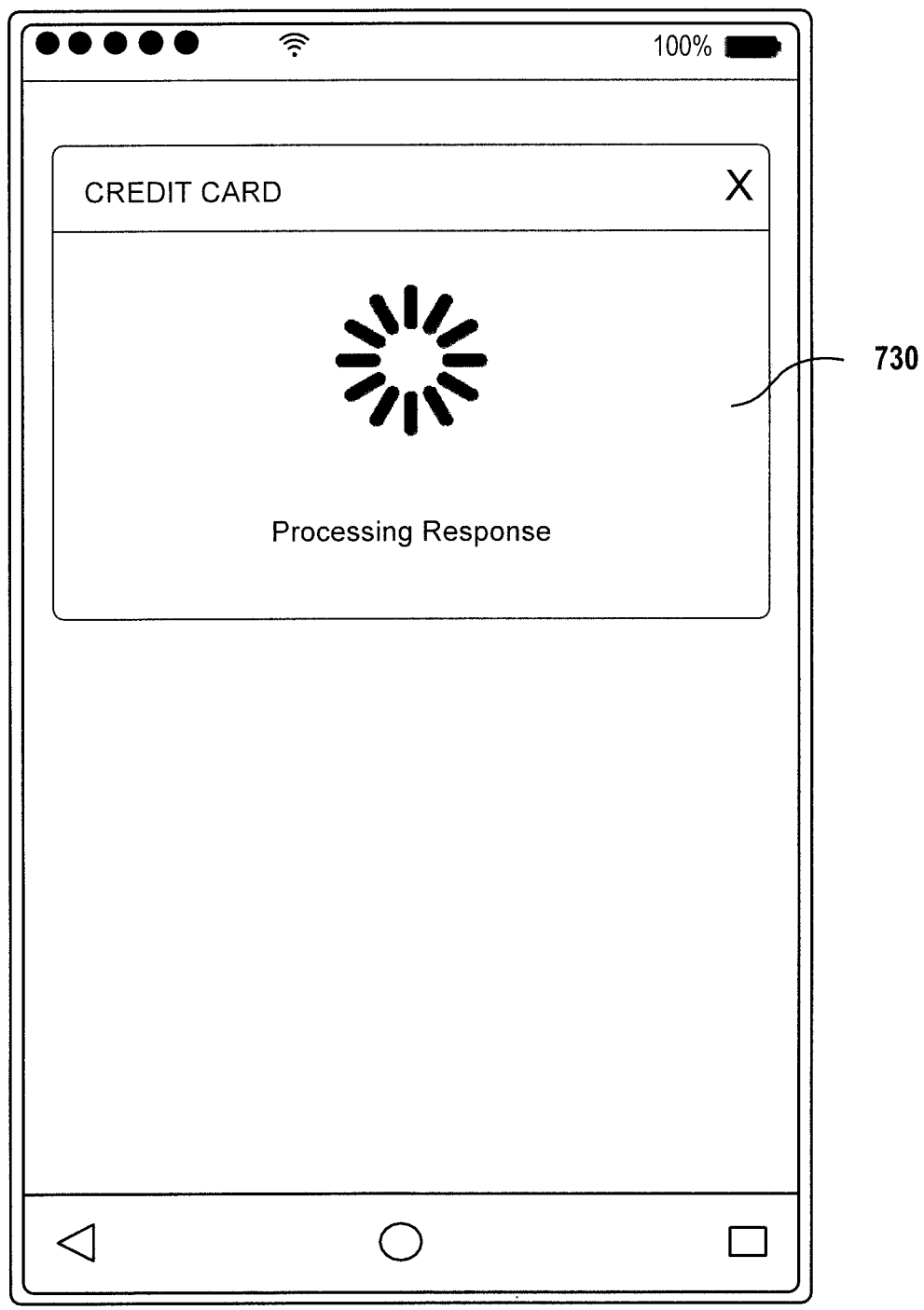
Figure 7D:
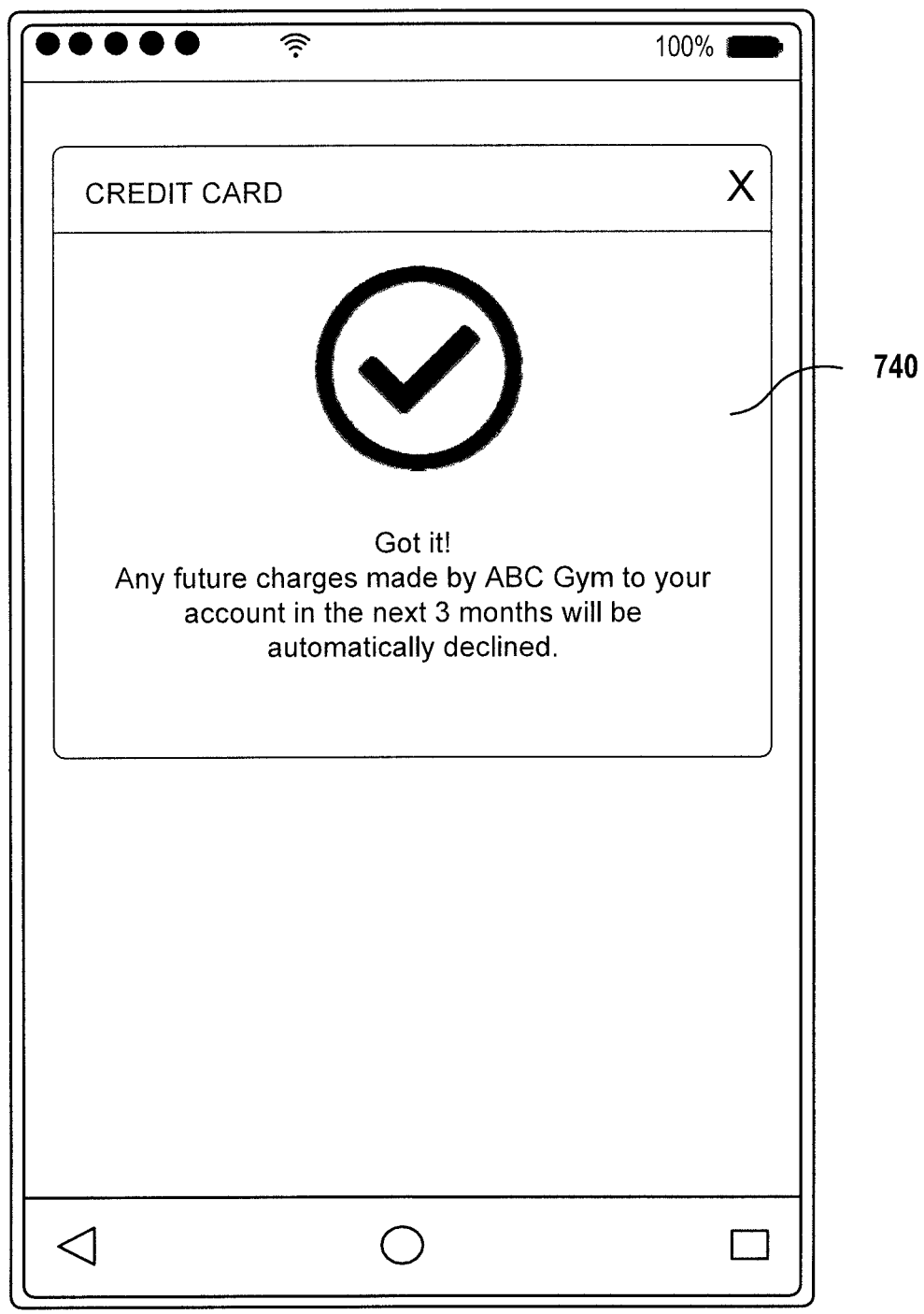

In some embodiments, the interface shown in FIG. 7B may be provided only after authentication of the user identity, for example, by verifying a password, a confidential graphical pattern, a fingerprint, a facial feature, etc. If the user selects button 722 to accept the blocking option, an interface shown in FIG. 7C may be displayed showing a message indicating that the request to block the merchant is being processed. After the merchant has been successfully blocked (e.g., added to the block-charge list or the block-payment list as discussed above), an interface shown in FIG. 7D may be displayed, and a message 740 may be displayed informing the user that the merchant has been blocked, as well as other related information such as the duration in which the blocking feature stays in effect.

The above-described processes may be implemented as a computer program or application or as a plugin module or sub-component of another application. Some of the described processes may be executed by a computing system 200 of FSP system 130, merchant system 120, user device 112 or other system provided as part of payment processing network 145. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity performing the transaction authorization methods, it is to be understood that consistent with disclosed embodiments another entity provided as part of payment processing network 145, for example, may provide such services in conjunction with or separate from a financial service provider.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

The invention claimed is:

1. A system for blocking merchant charges to a payment account of a user, the system comprising:
    one or more memory devices storing instructions; and
    one or more processors configured to execute the instructions to perform operations comprising:
        receiving, from a user device, a dispute request of a charge by a merchant to the payment account;
        identifying the merchant associated with the dispute request;
        in response to receiving the dispute request, determining whether to block subsequent charges applied by the merchant to the payment account based on a history of charging activities of the merchant;
        providing instructions to the user device to display an application interface for the user to accept or decline blocking subsequent charges by the merchant;
        receiving, via the user device, the user's input to accept blocking subsequent charges by the merchant;
        responsive to the receipt of the user's input to block subsequent charges, adding the merchant to a block-charge list associated with the payment account;
        receiving a transaction authorization request to charge the payment account;
        determining whether the merchant on the block-charge list initiated the transaction authorization request; and
        responsive to the determination that the merchant on the block-charge list initiated the transaction authorization request, declining the transaction authorization request.

2. The system of claim 1, wherein:
    the history of charging activities comprises a number of dispute requests received against the merchant; and
    the operations comprise determining to block subsequent charges applied by the merchant to the payment account when the number of dispute requests received against the merchant exceeds a predetermined threshold.

3. The system of claim 1, wherein:
    the history of charging activities comprises a number of dispute requests received from the user against the merchant; and
    the operations comprise determining to block subsequent charges applied by the merchant to the payment account when the number of dispute requests received from the user against the merchant exceeds a predetermined threshold.

4. The system of claim 1, wherein:
    the history of charging activities of the merchant comprises a number of repeated charges applied by the merchant to the payment account; and the operations comprise determining to block subsequent charges applied by the merchant to the payment account when the number of the repeated charges exceeds a predetermined threshold.

5. The system of claim 1, wherein adding the merchant to the block-charge list comprises:
determining a merchant identifier identifying the merchant; and
adding the merchant identifier to the block-charge list.

6. The system of claim 5, wherein the operations comprise:
determining a merchant identification code based on the transaction authorization request;
determining whether the merchant identification code matches the merchant identifier in the block-charge list; and
responsive to the determination that the merchant identification code matches the merchant identifier in the block-charge list, determining that the merchant on the block-charge list initiated the transaction authorization request.

7. The system of claim 1, wherein the operations comprise:
determining a reputation score for the merchant based on the history of charging activities of the merchant; and
adding the merchant to the block-charge list when the reputation score is below a predetermined threshold.

8. The system of claim 7, wherein the reputation score is based on at least one of:
a number of dispute requests received against the merchant;
a number of repeated charges applied by the merchant to the payment account; or
a number of dispute requests received from the user against the merchant.

9. The system of claim 7, wherein the operations comprise:
updating the reputation score of the merchant based on the dispute request received from the user.

10. The system of claim 1, wherein the operations comprise:
removing the merchant from the block-charge list after a predetermined period of time.

11. A computer-implemented method for blocking merchant charges to a payment account of a user, the method comprising:
receiving, from a user device, a dispute request of a charge by a merchant to the payment account;
identifying the merchant associated with the dispute request;
in response to the dispute request, determining whether to block subsequent charges applied by the merchant to the payment account based on a history of charging activities of the merchant;
providing instructions to the user device to display an application interface for the user to accept or decline blocking subsequent charges by the merchant;
receiving, via the user device, the user's input to accept blocking subsequent charges by the merchant;
responsive to the receipt of the user's input to block subsequent charges, adding the merchant to a block-charge list associated with the payment account;
receiving a transaction authorization request to charge the payment account;
determining whether the merchant on the block-charge list initiated the transaction authorization request; and
responsive to the determination that the merchant on the block-charge list initiated the transaction authorization request, declining the transaction authorization request.

12. The computer-implemented method of claim 11, wherein:
the history of charging activities of the merchant comprises a number of dispute requests received against the merchant; and
the method comprises determining to block subsequent charges applied by the merchant to the payment account when the number of dispute requests received against the merchant exceeds a predetermined threshold.

13. The computer-implemented method of claim 11, wherein:
the history of charging activities of the merchant comprises a number of dispute requests received from the user against the merchant; and
the method comprises determining to block subsequent charges applied by the merchant to the payment account when the number of dispute requests received from the user against the merchant exceeds a predetermined threshold.

14. The computer-implemented method of claim 11, wherein:
the history of charging activities of the merchant comprises a number of repeated charges applied by the merchant to the payment account; and
the method comprises determining to block subsequent charges applied by the merchant to the payment account when the number of the repeated charges exceeds a predetermined threshold.

15. The computer-implemented method of claim 11, wherein adding the merchant to the block-charge list comprises:
determining a merchant identifier identifying the merchant; and adding the merchant identifier to the block-charge list.

16. The computer-implemented method of claim 15, further comprising:
determining a merchant identification code based on the transaction authorization request;
determining whether the merchant identification code matches the merchant identifier in the block-charge list; and
responsive to the determination that the merchant identification code matches the merchant identifier in the block-charge list, determining that the merchant on the block-charge list initiated the transaction authorization request.

17. The computer-implemented method of claim 11, further comprising:
determining a reputation score for the merchant based on the history of charging activities of the merchant; and
adding the merchant to the block-charge list when the reputation score is below a predetermined threshold.

18. The computer-implemented method of claim 17, wherein the reputation score is based on at least one of:
a number of dispute requests received against the merchant;
a number of repeated charges applied by the merchant to the payment account; or
a number of dispute requests received from the user against the merchant.

19. The computer-implemented method of claim 17, further comprising:

updating the reputation score of the merchant based on the dispute request received from the user.

20. A non-transitory computer-readable medium storing instructions executable by a processor to cause the processor to perform operations for blocking merchant charges to a payment account of a user, the operations comprising:
receiving, from a user device, a dispute request of a charge by a merchant to the payment account;
identifying the merchant associated with the dispute request;
in response to the dispute request, determining whether to block subsequent charges applied by the merchant to the payment account based on a history of charging activities of the merchant;
providing instructions to the user device to display an application interface for the user to accept or decline blocking subsequent charges by the merchant;
receiving, via the user device, the user's input to accept blocking subsequent charges by the merchant;
responsive to the determination to block subsequent charges, adding the merchant to a block-charge list associated with the payment account;
receiving a transaction authorization request to charge the payment account;
determining whether the merchant on the block-charge list initiated the transaction authorization request; and
responsive to the receipt of the user's input that the merchant on the block-charge list initiated the transaction authorization request, declining the transaction authorization request.

* * * * *